3,243,405
PROCESSING OF ETHYLENE-PROPYLENE COPOLYMER

Jackson S. Boyer, Northridge, Del., and Charles E. Scott, Yardley, Pa., assignors to Sun Oil Company, Philadelphia, Pa., a corporation of New Jersey
No Drawing. Filed Dec. 2, 1964, Ser. No. 415,460
10 Claims. (Cl. 260—41)

This application is a continuation-in-part of our copending application Serial No. 102,628, filed April 13, 1961.

This invention relates to improvements in the processing of raw ethylene-propylene copolymers and more particularly to a preliminary treatment of the copolymer prior to crosslinking whereby a compounded copolymer of improved plasticity is produced.

Specifically this invention relates to a method of conditioning raw ethylene-propylene copolymers to render the copolymer compatible with carbon black and other curing agents when these agents are blended with the copolymer prior to vulcanization.

The copolymerization of ethylene and propylene in the presence of a coordination complex catalyst to yield a product resembling unvulcanized rubber has been heretofore described, particularly in Belgian Patent 553,655. Crosslinking of the polymer by curatives such as organic peroxides to yield high quality elastomers is also known to the art. For example, Belgian Patent 563,834 describes the vulcanization of copolymers with maleic acid and tertiary butyl peroxide.

The presently known art of processing raw ethylene-propylene copolymer rubber compounds consists of three steps. First, compounding said rubber with a mixture of compounds which are known to effect crosslinking of said rubber. These compounds normally comprise major amounts of carbon black (25 to 75 parts per 100 parts of rubber) and a crosslinking agent such as an organic peroxide (4 to 20 parts per 100 parts of rubber); and minor amounts of compounds such as zinc oxide and sulfur. The second step consists of extruding the mixture of curing agents and rubber into a vulcanizing mold. The final step then consists of vulcanization which is normally achieved by heat application.

It has been found that in compounding raw synthetic rubbers, particularly ethylene-propylene copolymer rubber with curing agents, the resultant mixture has a resistance to flow as measured by Mooney viscosity which is greatly increased over the Mooney viscosity of the raw rubber, and which at that level is unusable for commercial extrusion applications. Carbon black has been found to be the component of the curing blend which causes an ethylene-propylene copolymer rubber to have such unattractive flow properties when the carbon black is blended therewith. This increase in the Mooney viscosity of the copolymer and carbon black blend is attributed to the lack of compatibility of these two components with each other. Physical structure of raw ethylene-propylene copolymer is such that the large quantities of carbon black which are normally blended with the copolymer prior to vulcanization are not readily accepted by the compolymer and therefore the increase in resistance to flow of the compounded mixture is a natural result of this phenomena. This problem has been overcome in some instances by the addition of processing oils to the mixture. However, there are many applications where an oil-containing rubber is undesirable and therefore other means of producing a commercially extrudable vulcanizable blend of raw ethylene-propylene copolymer rubber and curing agents are necessary.

It has now been discovered that when a small amount of organic peroxide, which amount is less than that normally necessary to crosslink the synthetic rubber, is added to the raw ethylene-propylene copolymer rubber and the mixture is heated and masticated for a specific length of time, the copolymer is thereby rendered more compatible with carbon black when the latter is subsequently added in the compounding step prior to vulcanization. The net result of this procedure is a more thermoplastic curable mixture of ethylene-propylene rubber and its curing blend.

It has also been discovered that if only a small amount of organic peroxide, as disclosed above, is added to the ethylene-propylene copolymer rubber at the same time that carbon black is mixed with the rubber and the mixture is masticated for a prescribed time in a given temperature range, the compatibility of the copolymer and the carbon black is even further enhanced. However, it is important that only the amount of organic peroxide specified, i.e., 0.1 to 1.0%, based on the weight of the copolymer be present during this step in order to avoid crosslinking the copolymer. Further, when a copolymer treated in the above described manner is compounded with the total amount of curing agents necessary for normal vulcanization, the resulting mixture has commercially attractive processing qualities, i.e., Mooney viscosity in the range of 70–100.

It is an object of this invention to provide a method for inducing compatibility between a raw ethylene-propylene copolymer rubber and curing agents, particularly carbon black, compounded therewith prior to vulcanization. It is also an object of this invention to provide a curable mixture of raw ethylene-propylene copolymer rubber and carbon black which is easily processed in commercial extruding equipment.

We have now discovered that the foregoing objects can be attained by milling the raw ethylene-propylene copolymer, either alone or in admixture with carbon black, with from about 0.1 to 1.0%, based on the weight of the copolymer, of an organic peroxide at a temperature above the decomposition temperature of the peroxide for a few minutes prior to compounding with the other curing agents. Preferably the milling temperature is from 300° F. to 400° F. when the peroxide used is dicumyl peroxide, but lower temperatures down to 250° F. can be used when a more active peroxide, such as benzoyl peroxide, is employed. The role of the peroxide in the pretreating step is not fully understood, since the expected action of the peroxide on the copolymer at elevated temperatures would be crosslinking to raise the Mooney viscosity.

The oragnic peroxides usuable in the process of the present invention are those organic peroxides known in the art which decompose and form free radicals when subjected to temperatures in the range of 200° F. to 400° F. The free radical-generating organic peroxides which can be used in the process of the present invention include the following symmetrical or bis(aralkyl) and bis(alkyl) peroxides: dibenzyl peroxide, bis($\alpha$-methylbenzyl) peroxide, bis (αα-dimethylnaphthylmethyl) peroxide, bis(αα-dimethyl-p-methylbenzyl) peroxide, bis(αα-dimethyl-p-isopropylbenzyl) peroxide and di-t-butyl peroxide.

Unsymmetrical peroxides useful in the invention include benzyl(α-methylbenzyl) peroxide, benzyl(α-methyl-p-methylbenzyl) peroxide, benzyl(α-methyl-p-isopropylbenzyl) peroxide, and T-butyl(αα-dimethylbenzyl) peroxide. Other well known catalysts useful in this invention include benzoyl peroxide, acetyl peroxide, lauroyl peroxide, t-butyl perbenzoate, cumene hydroperoxide, and dicumyl peroxide. Other free radical formers are the azo compounds such as αα-azobis(isobutyronitrile).

The mastication step of the present invention may be continued for as long as two hours without causing any substantial loss to the physical properties of the ethylene-propylene copolymer rubber; however, it has been found that for the purposes of this invention only 5 to 20 minutes is normally necessary to achieve the desired effect. For reasons of economics therefore 5 to 20 minutes is the preferred masticating time period for achieving the desired effects of the present invention.

It is conceived that in the process of the present invention a minor amount of crosslinking of the copolymer rubber being processed may take place. However, the amount of cross-linking that could possibly be realized under the above described conditions is so minor that no pronounced changes on physical properties of the copolymer are observed; therefore, for all intents and purposes, any such crosslinking is insignificant and can be ignored. The primary object of limiting the amount of organic peroxide added in the process of the present invention is to avoid crosslinking so that the compatibilty effect desired is dominant and the objects of the process are realized.

In order that those skilled in the art may more fully understand the nature of our invention and the method of carrying it out, the following examples are given, together with a control, showing operation of the invention. The same copolymer was used in all examples.

CONTROL

One hundred parts by weight of raw ethylene-propylene copolymer having a Mooney viscosity at 212° F. of 55 were mixed with 50 parts by weight of carbon black (Philblack 0), 4 parts of dicumyl peroxide, one part of zinc oxide, and one part of sulfur on a rubber mill. The resultant mixture had a Mooney viscosity at 212° F. of 179, which is far too high for easy processability on conventional rubber extrusion machinery.

Example I

One hundred parts by weight of raw ethylene-propylene copolymer and 0.5 part of dicumyl peroxide were mixed in a Banbury mixer for 10 minutes at 400° F. The treatment raised the Mooney viscosity at 212° F. from 55 to 75. However, when the treated copolymer was compounded on the rubber mill with 50 parts of carbon black, 3.5 parts of dicumyl peroxide, and 1 part of sulfur, the Mooney viscosity of the compound was 104. If the preliminary Banbury treatment had been omitted, the Mooney viscosity would have been 179 (see Control). While the viscosity of the compounded copolymer was slightly higher than desired, it is far superior to that of Control.

Example II

One hundred parts of raw ethylene-propylene copolymer were mixed with 50 parts of carbon black, one part of zinc oxide, and 0.25 part of dicumyl peroxide and the resulting composition was mixed in the Banbury mixer for 10.5 minutes at 400° F. After mixing, the Mooney viscosity at 212° F. was 116. The mixture was then fully compounded on a rubber mill with 3.75 parts of dicumyl peroxide and one part of sulfur to yield a compound having a Mooney viscosity of 75, which is within the desired range.

Example III

Example II was repeated, using 0.5 part of dicumyl peroxide in the Banbury step, and 3.5 parts of dicumyl peroxide in the compounding step. Otherwise the quantities of material and the processing conditions were the same. The mixture from the Banbury had a Mooney viscosity at 212° F. of 106, and the compounded Mooney viscosity was 72.

Example IV

Example II was repeated, except that the temperature in the Banbury mixer was 300° F. The Mooney viscosity at 212° F. of the material recovered from the Banbury mixer was 171, and that of the compounded material was 94.

Example V

Example III was repeated, except that the temperature in the Banbury mixer was 300° F. The Mooney viscosity at 212° F. of the material recovered from the Banbury was 113, and the compounded viscosity was 76.

Example VI

Example V was repeated except that the quantity of dicumyl peroxide in the Banbury step was increased to 1 part, and the quantity of dicumyl peroxide in the compounding step was decreased to 3 parts. The Mooney viscosity at 212° F. of the material recovered from the Banbury mixer was 118, and the compounded viscosity was 70.

Example VII

Example V was repeated, except that the temperature in the Banbury mixer was increased to 320° F. and the time at this temperature was decreased to 7⅝ minutes. The Mooney viscosity of the material recovered from the Banbury mixer was 118, and the compound viscosity was 76.

Example VIII

One hundred parts by weight of copolymer, 0.5 part of cumene hydroperoxide, 50 parts of carbon black and 1 part of zinc oxide were mixed in the Banbury mixer at 400° F. for 10 minutes. The mixture had a Mooney viscosity at 212° F. of 110.5. The mixture was then compounded on a rubber mill with 3.5 parts of dicumyl peroxide and 1 part of sulfur. The compound had a Mooney viscosity at 212° F. of 80.

The above disclosed examples when compared to the control which represents the presently known procedure of compounding ethylene-propylene copolymer rubber and curing agents illustrate the advantages of the present invention. This invention is not limited to the specific organic peroxides named hereinabove, and any of the organic peroxides which decompose in the temperature range given and are known to crosslink ethylene-propylene copolymer rubber can be used in the process of this invention. Physical properties of the polymer treated according to the Control and Examples I through VIII, and cured for various periods of time, are set forth in the following table.

TABLE

| Example or Control | Control | Examples | | | | | | | |
|---|---|---|---|---|---|---|---|---|---|
| | | I | II | III | IV | V | VI | VII | VIII |
| Recipe, Banbury Step: | | | | | | | | | |
|   Copolymer | 0 | 100 | 100 | 100 | 100 | 100 | 100 | 100 | 100 |
|   Dicumyl Peroxide | 0 | 0.5 | 0.25 | 0.5 | 0.25 | 0.5 | 1 | 0.5 | [1] 0.5 |
|   Carbon Black (HAF) | 0 | 0 | 50 | 50 | 50 | 50 | 50 | 50 | 50 |
|   Zinc Oxide | 0 | 0 | 1 | 1 | 1 | 1 | 1 | 1 | 1 |
| Minutes in Banbury | 0 | 10 | 10.5 | 10.5 | 10 | 10 | 10 | 8 | 10 |
| Temp. in Banbury, °F | 0 | 400 | 400 | 400 | 300 | 300 | 300 | 320 | 400 |
| ML-4 at 212° F. (mix) | 0 | 73 | 116 | 106 | 171 | 113 | 99 | 118 | 110.5 |
| Recipe, Milling Step | | Material from Banbury step plus | | | | | | | |
|   Copolymer parts | 100 | | | | | | | | |
|   Carbon Black (HAF) | 50 | 50 | | | | | | | |
|   Zinc Oxide | 1 | | | | | | | | |
|   Dicumyl Peroxide | 4 | 3.5 | 3.75 | 3.5 | 3.75 | 3.5 | 3 | 3.5 | 3.5 |
|   Sulfur | 1 | 1 | 1 | 1 | 1 | 1 | 1 | 1 | 1 |
| ML-4 at 212° F. (Compound) | 179 | 104 | 75 | 72 | 94 | 76 | 70 | 76 | 80 |
| Physical Properties (all cured @ 300° F.): | | | | | | | | | |
| Tensile: | | | | | | | | | |
|   30 min. cure | 2,650 | 2,075 | 2,275 | 2,050 | 2,825 | 2,625 | 2,300 | | 2,300 |
|   45 min. cure | 2,600 | 2,550 | 2,450 | 2,225 | 2,900 | 2,825 | 2,275 | | 2,625 |
|   60 min. cure | | 2,675 | 2,625 | 2,425 | 2,900 | 2,850 | 2,600 | | 2,625 |
| 300% Modulus: | | | | | | | | | |
|   30 min. cure | 850 | 1,250 | 1,225 | 1,325 | 975 | 1,050 | 925 | | 775 |
|   45 min. cure | 1,175 | 1,700 | 1,625 | 1,625 | 1,250 | 1,250 | 1,150 | | 900 |
|   60 min. cure | | 1,775 | 1,750 | 1,625 | 1,350 | 1,500 | 1,325 | | 1,000 |
| Percent Elongation: | | | | | | | | | |
|   30 min. cure | 625 | 455 | 475 | 425 | 600 | 590 | 540 | | 640 |
|   45 min. cure | 535 | 425 | 410 | 405 | 540 | 520 | 485 | | 595 |
|   60 min. cure | | 425 | 405 | 405 | 500 | 480 | 490 | | 585 |
| Shore A: Hardness: | | | | | | | | | |
|   30 min. cure | 57 | 60 | 56 | 58 | 59 | 57 | 57 | | 52 |
|   45 min. cure | 57 | 62 | 60 | 59 | 61 | 59 | 59 | | 60 |
|   60 min. cure | | 65 | 61 | 60 | 59 | 57 | 57 | | 58 |
| Percent Permanent Set: | | | | | | | | | |
|   30 min. cure | 31 | 25 | 25 | 25 | 25 | 25 | 25 | | 44 |
|   45 min. cure | 25 | 19 | 19 | 19 | 19 | 19 | 19 | | 31 |
|   60 min. cure | | 19 | 19 | 19 | 19 | 19 | 19 | | 31 |
| Tear Strength: | | | | | | | | | |
|   30 min. cure | 208 | 185 | 181 | 168 | 255 | 237 | 229 | | 173 |
|   45 min. cure | 160 | 184 | 144 | 172 | 181 | 164 | 165 | | 213 |
|   60 min. cure | | 200 | 144 | 144 | 163 | 207 | 130 | | 240 |

[1] Cumene hydroperoxide used instead of dicumyl peroxide.

We claim:

1. A method of improving the processability of unvulcanized ethylene-propylene copolymer rubber prior to vulcanization which comprises, prior to compounding a vulcanizable mixture of said copolymer and curing agents comprising carbon black and an organic peroxide, masticating said copolymer together with about 0.1 to 1.0 percent by weight based on the weight of the copolymer of an organic peroxide normally effective to crosslink said copolymer at a temperature above the decomposition temperature of the peroxide and within the range of about 250° F. and 400° F. until the Mooney viscosity of said compounded vulcanizable mixture is substantially lower than the Mooney viscosity of such vulcanizable mixture would be without masticating in the presence of said organic peroxide.

2. Method according to claim 1 wherein the masticating time is from about 5 to about 20 minutes.

3. Method according to claim 1 wherein the organic peroxide is benzoyl peroxide.

4. Method according to claim 1 wherein the organic peroxide is dicumyl peroxide.

5. Method according to claim 1 wherein the organic peroxide is cumene hydroperoxide.

6. A method of improving the processability of an unvulcanized mixture of ethylene-propylene copolymer rubber and carbon black prior to vulcanization which comprises, prior to compounding a vulcanizable mixture of said copolymer and curing agents, masticating said copolymer together with 25–75 parts of carbon black per 100 parts of copolymer and about 0.1 to 1.0 percent by weight based on the weight of the copolymer of an organic peroxide normally effective to crosslink said copolymer at a temperature above the decomposition temperature of the peroxide and within the range of about 250° F. and 400° F. until the Mooney viscosity of said compounded vulcanizable mixture is substantially lower than the Mooney viscosity of such vulcanizable mixture would be without masticating in the presence of said organic peroxide.

7. Method according to claim 6 wherein the masticating time is from about 5 to about 20 minutes.

8. Method according to claim 6 wherein the organic peroxide is benzoyl peroxide.

9. Method according to claim 6 wherein the organic peroxide is dicumyl peroxide.

10. Method according to claim 6 wherein the organic peroxide is cumene hydroperoxide.

References Cited by the Examiner

UNITED STATES PATENTS 2,916,481  12/1959  Gilmont _____ 260—41
3,012,020  12/1961  Kirk et al. _____ 260—94.96
3,036,981  5/1962  Ropp _____ 260—94.96
3,047,552  7/1962  Reynolds et al. _____ 260—88.2

FOREIGN PATENTS 896,598  5/1962  Great Britain.

MORRIS LIEBMAN, *Primary Examiner.*

K. B. CLARKE, J. S. WALDRON, *Assistant Examiners.*